H. SILVER.

VENTILATING CUPOLA FOR BARNS AND THE LIKE.

APPLICATION FILED JULY 30, 1921.

Reissued Nov. 8, 1921. 15,223.

2 SHEETS—SHEET 1.

INVENTOR

Herman Silver

BY

William Louden,

ATTORNEY

H. SILVER.

VENTILATING CUPOLA FOR BARNS AND THE LIKE.

APPLICATION FILED JULY 30, 1921.

Reissued Nov. 8, 1921. 15,223.

2 SHEETS—SHEET 2.

INVENTOR

Herman Silver

BY

William Louden

ATTORNEY

UNITED STATES PATENT OFFICE.

HERMAN SILVER, OF FAIRFIELD, IOWA, ASSIGNOR TO THE LOUDEN MACHINERY COMPANY, OF FAIRFIELD, IOWA.

VENTILATING CUPOLA FOR BARNS AND THE LIKE.

15,223. Specification of Reissued Letters Patent. Reissued Nov. 8, 1921.

Original No. 1,312,586, dated August 12, 1919, Serial No. 262,650, filed November 15, 1918. Application for reissue filed July 30, 1921. Serial No. 488,729.

*To all whom it may concern:*

Be it known that I, HERMAN SILVER, a citizen of the United States, formerly residing at Minneapolis, in the county of Hennepin and State of Minnesota, but now residing at Fairfield, in the county of Jefferson and State of Iowa, have invented a new and useful Improvement in Ventilating Cupolas for Barns and the like, of which the following is a specification.

My invention relates to cupolas having attachments to regulate or modify currents of air, and to thereby assist in ventilating the building upon which the cupola is placed; and it consists of an improvement in the construction and arrangement of said attachments whereby an extremely simple and highly efficient ventilating cupola is produced, as will be fully set forth hereafter.

Figure 1:
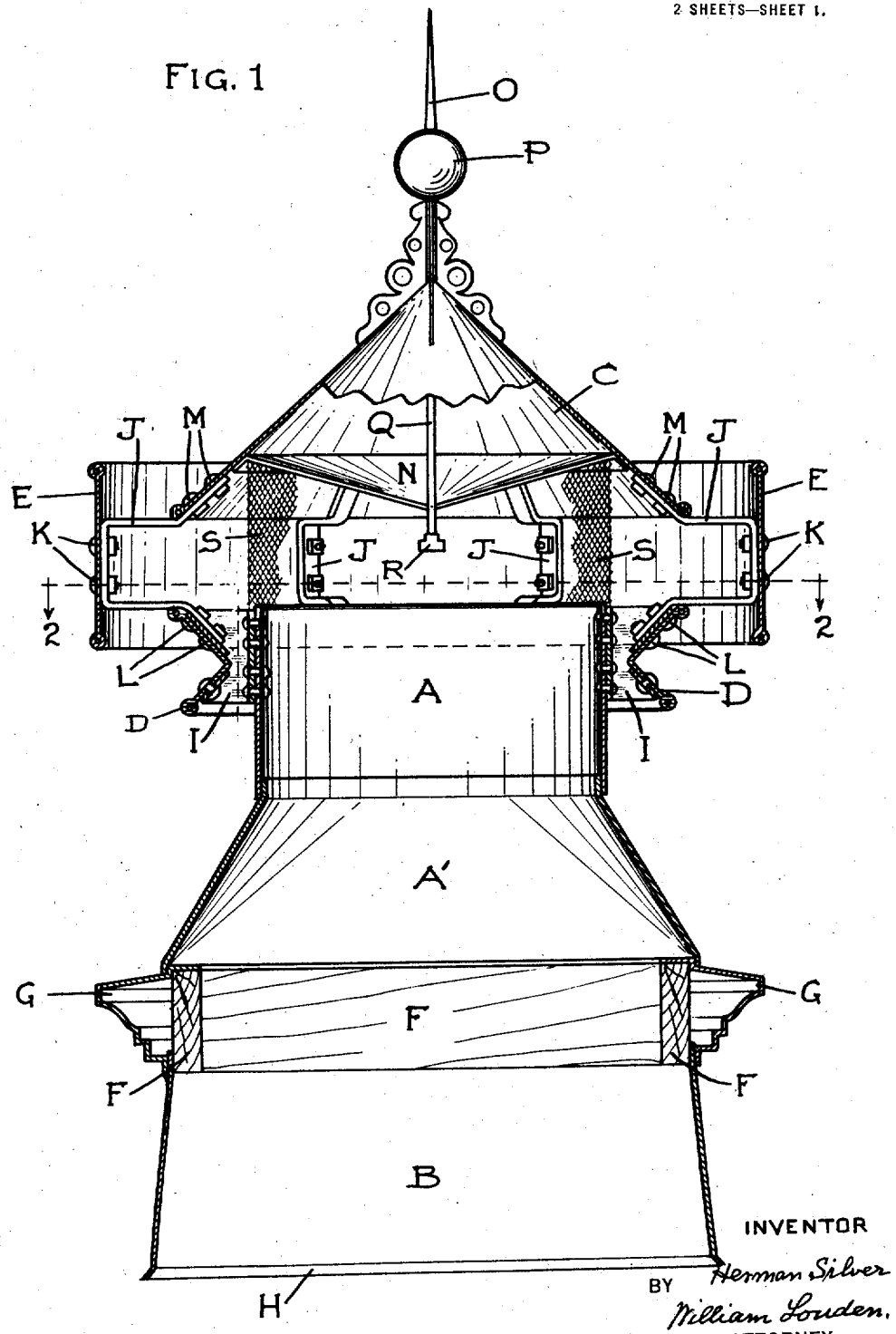
Figure 2:
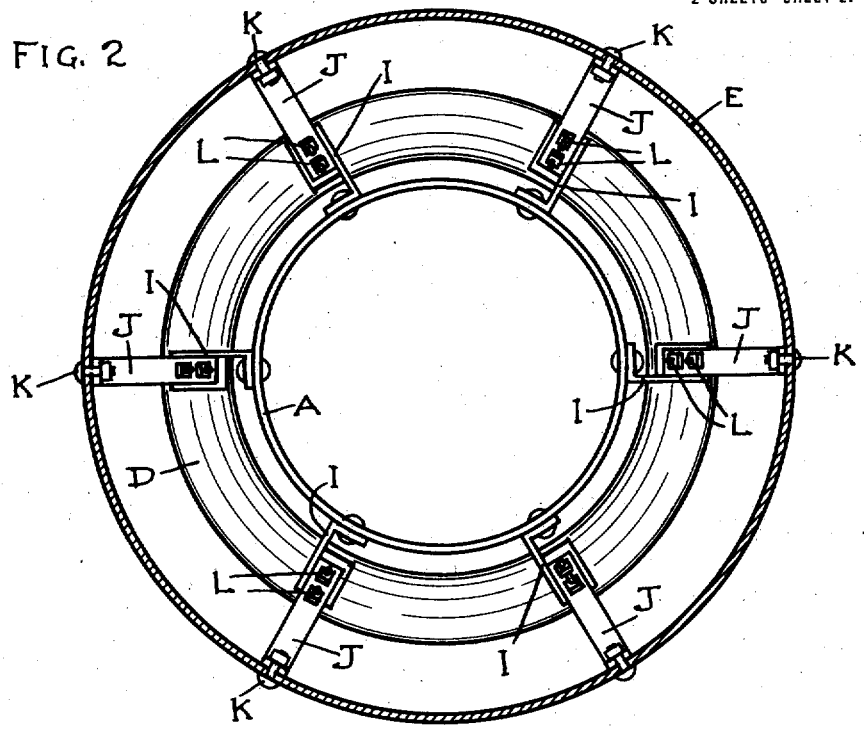
Figure 3:
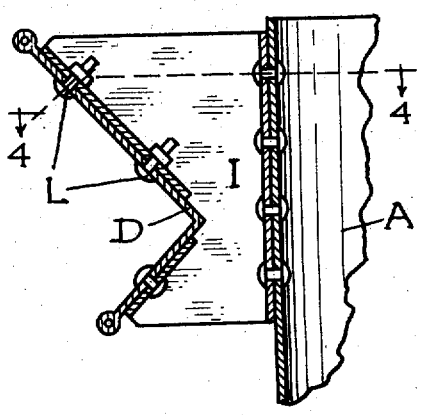
Figure 4:
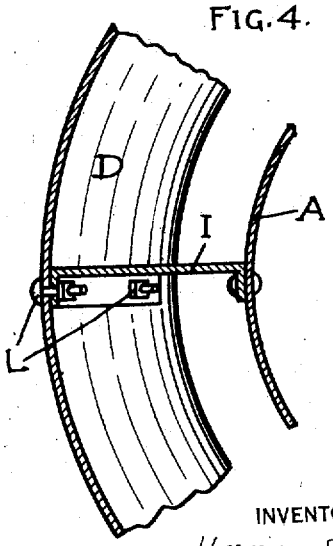

In the accompanying drawings forming a part of this specification, Figure 1 is a view of a cupola, partly in elevation and partly in central vertical section, and embodying my invention. Fig. 2 is a horizontal section on line 2—2 of Fig. 1, looking downward in the direction of the arrows, the cut-away portion of Fig. 1 being shown in this figure to make the drawing complete. Fig. 3 is an enlarged view of a portion of Fig. 1, which will be more fully explained later on. Fig. 4 is a horizontal section on line 4—4 of Fig. 3, looking in the direction of the arrows.

Referring to the drawing, my cupola consists essentially of a vertically disposed ventilating flue comprising an upper section A and a lower section A′, the flue being mounted on a base B, and provided with a cap C, an inner band D, an outer band E, and the connections joining them together, which will be described in detail hereafter. It is well known that cupolas are usually placed upon the roofs of buildings, preferably upon the peak of the roof. Therefore, the bottom of the base B may have to be cut to fit the pitch of the roof which is not shown in the drawings. Also, that the portion of the roof inside of the base will have to be cut away to permit the free passage of the air from the building up through the cupola.

The base B is preferably rectangular in horizontal section and on its upper edges is provided with frame timbers F to give it strength and to furnish a proper support for the lower section of the flue A′. It is also preferably fitted with a cornice G to add to its appearance and to form a more perfect water shed to keep out the rain. Furthermore, it may be fitted with a flange H on its lower edges to form a more perfect connection with the roof of the building on which it is placed.

The upper section of the flue is made cylindrical. The upper edge of the lower section is made to fit inside of the lower edge of the upper section while its lower edge is made to fit over the upper portion of the base, as shown in Fig. 1, thus forming a rain-tight joint in both connections.

The inner band D is made angular, in cross-section, the sides of the band being disposed toward each other at substantially right angles. The inner band surrounds the upper portion of the flue section A and its upper edge is preferably placed in substantially the same horizontal plane as the upper end of the flue. It is connected to the flue, by a series of radially disposed circumferentially spaced apart brackets I which are constructed to hold the band a distance from the flue, the vertex of the angle being placed next to the flue and the upper and lower edges of the angle projecting outward.

The brackets I are preferably made of vertically disposed sheet metal plates having flanges on their opposite vertical edges bent at substantially right angles to their bodies so as to fit against the adjacent sides of the inner band and the flue, and are connected thereto by bolts or rivets, as shown in the drawings. It is further preferable that each of these brackets be constructed of a single plate of sheet metal and that the edges next the inner band be notched to fit the contour of its inner side. Also, that the vertical dimensions of the brackets should not exceed the vertical dimensions of the inner band.

I do not however, desire to confine myself to this exact construction. All that is essential is that the band be securely held in its proper position by the brackets with the vertex of its angle next to the flue, and the upper edges of the band and the flue in substantially the same horizontal alinement. Also, that the brackets be constructed so they will not interfere to any appreciable extent with the free passage of air currents in the space between the flue and the band, and will not be extended materially above the upper edges of the flue and the inner band.

The outer band E is made approximately straight in cross section and is considerably wider and larger in circumference than the inner band, whereby there will be a considerable space between them for the passage of air currents. Its lower edge is set some distance below the horizontal plane of the upper end of the flue—approximately on a level with the center of the inner band, and its upper edge approximately two or three times that distance above the horizontal plane of the upper end of the flue.

The outer band E is supported in its position by a series of circumferentially spaced apart braces J which are made approximately U-shaped with diverging ends, the sides of the braces assuming a substantially horizontal position. The central portions of these braces are preferably flattened and are connected to central portions of the outer band by bolts or rivets K. The lower diverging ends of the braces are secured to the outer upper flanges of the brackets I by detachable bolts L, and are supported thereby, thus holding the outer band in fixed position.

The cap C is cone shaped and is made wider than the flue so as to shelter it and keep out rain. Its lower edge is extended down below the horizontal plane of the upper edge of the outer band, approximately the same distance the lower edge of this band extends below the upper edge of the flue but still leaving a considerable space for the passing air currents between the cap and the flue. The lower edge of the cap rests upon and is supported by the diverging upper ends of the braces J, and is held in position thereon by the bolts or rivets M. Within the cap is an inverted slightly cone shaped plate N the object of which is to deflect air currents out from under the cap and thus prevent back draft down the flue. Above is a lightning rod point O with an ornamental ball P, and inside is a lightning rod tube Q with a T brass cable connection R for convenience in attaching a lightning rod system. A screen indicated by the diagonally checkered lines S, may be inserted between the upper edge of the flue and adjacent portions of the cap to keep out birds, bats, etc. The central portion of this screen is broken away to give a better view of the braces J on the rear side of the cupola.

The object of the cap and the outer and inner bands is to protect the flue and to prevent as much as possible, air currents from entering it and causing back draft, or otherwise interfering with the free passage of the air from the building up through the flue. It is therefore important, and essential to successful operation, that these attachments be constructed and arranged in a manner best calculated to secure this result. A variation in proportions, or in the arrangement of the parts, may produce a considerable difference in the successful operation of the ventilating qualities of the cupola, and to secure the best results in this direction is the object of my invention.

Air currents generally have an upward tendency. The warmest air is next the earth's surface and it is constantly rising from, or, we might say, rebounding from the earth's surface, and mingling with the cooler air above. Also, the wind coming in contact with the upwardly inclined roof of the building on which the cupola is placed will cause an upward current in the air surrounding the cupola. At other times, as in a storm when the cold air is rushing in to take the place of the ascending heated air which is driven ahead of the storm, the air currents may be decidedly downward. Therefore cupola attachment to be successful in operation must be constructed to control both upward and downward currents of air.

The purpose of the outer band is to ward off air currents and prevent them from entering the flue. But the outer band alone cannot always accomplish this result. It must be supplemented by a conical shaped cap, and also by some additional means which will properly take care of upward air currents below the band. This is the special province of my specially constructed inner band which as already stated, is substantially right angular in cross section, and as shown in the drawings, has the widest flange on the upper edge.

An upward air current striking the outer band will be deflected over it and will pass over the conical cap, while the current immediately below the outer band, which would be liable to get into the flue and cause a back draft therein, is warded off by my inner band, and is deflected and carried upwardly and outwardly by the large upper flange, into the sheltered space afforded by the outer band, and from there it will be carried farther upward by the suction caused by the current of air passing over the outer band and over the cap C.

A portion of the air current will be carried in the concave side of the inner band to the other side of the cupola where it will assist in creating a suction there to draw air away from the flue, and down through the opening between it and the outer band. Also, a small portion of an upward current striking the body of the flue below the inner band will be carried upward between its apex and the flue where the air will be diffused and the current slackened by the larger space at the upper edge of the band and where it will be caught and carried upward and outward by the suction of the current passing by the outer side of the upper flange of the band, and will be largely carried up through the space between the outer band and the cap where it will be caught and carried farther upward by the suction of the air passing above the outer band. It is important that the space between the upper edge of the inner band and the upper end of the flue be wider than the space between the vertex and the flue so that an upward air current will be diffused and slackened at this point.

When there is a downwardly disposed current the portion above the outer band will be largely caught by the cap, the edge of which is considerably lower than the upper edge of the outer band, and will be deflected off without being permitted to enter the space below the cap and to pass into the flue, while the current below the outer band will practically miss the inner band and will be deflected around the body of the flue. It is therefore important that the upper flange of the inner band should be as wide as the lower flange and preferably wider, and that the lower flange should not be extended far below the lower edge of the outer band.

It is well known that difference in temperature is the cause of air currents. If the temperature was the same everywhere there would be a dead calm and there would be no currents of air anywhere. In chimneys where there is fire there is not so much trouble with air currents because the difference of temperature in the inside and outside air, is so great that the draft will generally be sufficient to overcome adverse outside currents, and yet under certain conditions, outside adverse currents have been known to reverse the draft and force the heated smoke of a stove or fire place out below. Therefore, in a system of natural ventilation where there can only be a slight difference in the temperature of the inside and outside air, it is important that effective means be used to protect the flue and control as much as possible, the outside currents.

Applicant has done this by using improved means to deflect these outside adverse currents and by providing sheltered places adjacent to the deflected currents, so that the suction created by the deflected currents will draw the air away from the sheltered places near the flue and to thus create a ventilating draft therein. The air currents passing over and around the outer and inner bands will create more or less of a suction on the leeward side of the cupola, and this suction will also assist in drawing the air out from under the cap and away from the flue.

In addition to this there are certain other advantages in my construction, some of which it may be well to note. Frequently, it is necessary, or at least advantageous, to separate a cupola into two or more parts, especially when shipping or placing the cupola on a building. With my invention all that is necessary to separate the cupola into two parts is to take out the bolts L which connect the braces J to the brackets I. The upper part of the cupola consisting of the outer band and the cap with their attachments, the lightning rod portions and ornamental ball, and the supporting braces J, will be separated from the other parts of the cupola.

Fig. 3 is an enlarged view of a portion of the left side of Fig. 1, showing a vertical section of the flue A and the inner band D connected together by one of the brackets I, the bolts L being in place, but the adjoining section of the outer band and the brace J which supports it on the bracket being removed. It will be noticed that the lower ends of the braces J do not extend below the lower edge of the outer band. Therefore when the parts of the cupola are separated the braces will be protected by the lower edge of the band, and the section may be handled, and crated when necessary, without danger of breaking or bending the braces which could not be readily done if they extended a distance below the edge of the outer band.

Another point. It costs practically nothing extra to attach the braces J to the brackets I. The bolts L have to be used anyway to connect the inner band to the brackets I and all that is needed extra to attach the braces J, is to make the bolts a trifle longer so that they will pass through the braces as well as through the brackets and the band. There are no extra holes to drill through the wall of the flue or anywhere else—nothing but a trifling added length of the bolts L. With my construction the upper end of the flue does not have to be flared thereby, also saving quite an item of expense. Neither is there any place where debris can accumulate as there will be with cupolas having attachments closely connected to the flue. In addition to this the entire structure of my cupola is extremely simple and cheaply made besides being strong and compact and highly efficient in operation.

I am aware that inner and outer bands and conical caps have been previously used in combination with ventilating flues but they have not been constructed and arranged in the improved manner herewith shown and described, and this improved construction and arrangement is responsible for the success of my ventilating cupola.

What I claim is as follows:

1. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section, and the vertex of the band being set toward the flue with a space between them.

2. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section, the vertex of the band being set toward the flue with a space between them, and the upper edge of the band in approximately the same horizontal plane as the upper end of the flue.

3. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section, the vertex of the band being set toward the flue and the space between its upper edge and the flue being wider than the space between the vertex and the flue.

4. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section, the vertex of the band being set toward the flue with a space between them, and a series of radially disposed circumferentially spaced apart brackets having their inner edges secured to the flue and their outer edges connected to the inner band whereby said band will be supported on the flue.

5. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section, the vertex of the band being set toward the flue with a space between them; a series of radially disposed circumferentially spaced apart brackets having their inner edges secured to the flue and their outer edges connected to the inner band whereby said band will be supported on the flue, the outer edges of the brackets being notched to fit the contour of the adjacent face of the band.

6. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section and the vertex of the band being set toward the flue with a space between them; a series of radially disposed brackets having their inner edges secured to the flue and their outer edges connected to the inner band, and a series of circumferentially spaced apart braces having their lower ends secured to the brackets; their upper ends connected to the cap, and their central portions connected to the outer band, whereby the cap and the outer band will be held in position by the braces being attached to the brackets.

7. In combination with a vertically disposed ventilating flue having a cone shaped cap placed a distance above its upper end and an outer band surrounding the upper end of the flue and the lower edge of the cap at a distance therefrom, of an inner band interposed in the space between the outer band and the flue, said inner band being substantially right angular in cross section and the vertex of the band being set toward the flue with a space between them; a series of radially disposed brackets having their inner edges secured to the flue and their outer edges connected to the inner band, and a series of angularly shaped braces with horizontally disposed sides having upwardly and downwardly diverging ends; the downwardly diverging ends being secured to the aforesaid brackets; their upwardly diverging ends being connected to the cap and their central portions connected to the outer band, said braces thus supporting the cap and the outer band in position by their attachment to the brackets.

Fairfield, Iowa, July 27, 1921.

HERMAN SILVER.